United States Patent [19]

Ozawa

[11] Patent Number: 5,542,726
[45] Date of Patent: Aug. 6, 1996

[54] VACUUM FIXING DEVICE FOR PARTS

[75] Inventor: Kazushige Ozawa, Shizuoka, Japan

[73] Assignee: Tenryu Technics Co., Ltd., Shizuoka, Japan

[21] Appl. No.: 581,310

[22] Filed: Dec. 28, 1995

Related U.S. Application Data

[63] Continuation of Ser. No. 183,502, Jan. 18, 1994, abandoned.

[30] Foreign Application Priority Data

Jan. 18, 1993 [JP] Japan ................................. 5-005569

[51] Int. Cl.⁶ ........................................................ B66C 1/02
[52] U.S. Cl. ................................................ 294/64.1; 29/743
[58] Field of Search ..................... 294/2, 64.1; 901/40; 29/740, 743; 414/627, 737

[56] References Cited

U.S. PATENT DOCUMENTS

| | | | |
|---|---|---|---|
| 4,728,135 | 3/1988 | Sugimura et al. | 29/743 X |
| 4,762,354 | 8/1988 | Gfeller et al. | 29/743 X |
| 4,852,247 | 8/1989 | Hawkswell | 29/743 X |
| 4,887,351 | 12/1989 | Porterfield et al. | 29/743 X |

FOREIGN PATENT DOCUMENTS

| | | | |
|---|---|---|---|
| 2040681 | 1/1971 | France | 294/64.1 |
| 3-142187 | 6/1991 | Japan | 901/40 |
| 4-343693 | 11/1992 | Japan | 294/64.1 |
| 1771958 | 10/1992 | U.S.S.R. | 294/64.1 |
| 1193921 | 6/1970 | United Kingdom | 294/64.1 |

*Primary Examiner*—Dean Kramer
*Attorney, Agent, or Firm*—McCormick, Paulding & Huber

[57] ABSTRACT

A vacuum fixing device for parts, comprising a small pad portion 1 and a large pad portion 2, which are different in diameter from each other and each formed therein with suction paths and provided on one and the same axis, wherein the small pad portion 1 is switched over to the large pad portion 2 or vice versa. When a small part 14 is sucked, a movable shaft 11 of the large pad portion 2 is slid downwardly, and suction is performed through a suction path 3 of a small pad 4 and a suction path 5 of a fixed shaft 7, and, when a large part 15 is sucked, the suction is performed through both suction routes including a route through a suction path 8 of a large pad 9, a suction path 10 of the movable shaft 11, and air paths 6 and a suction path 5 of the fixed shaft, and another route through a suction path 3 of the small pad 4 and a suction path 5 of the fixed shaft 7.

2 Claims, 1 Drawing Sheet

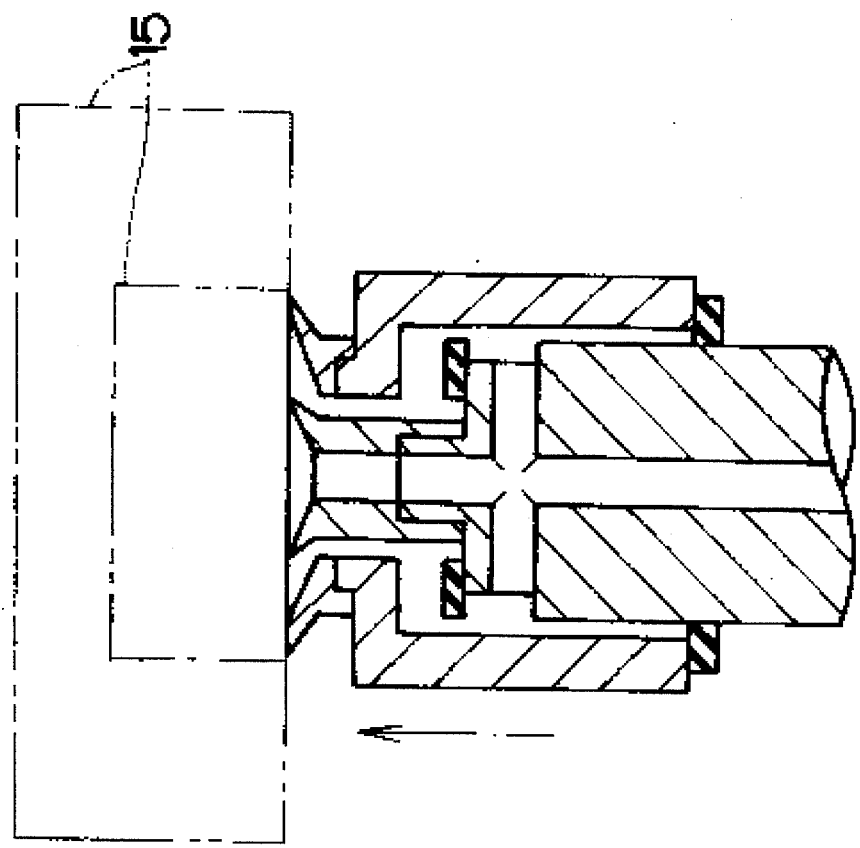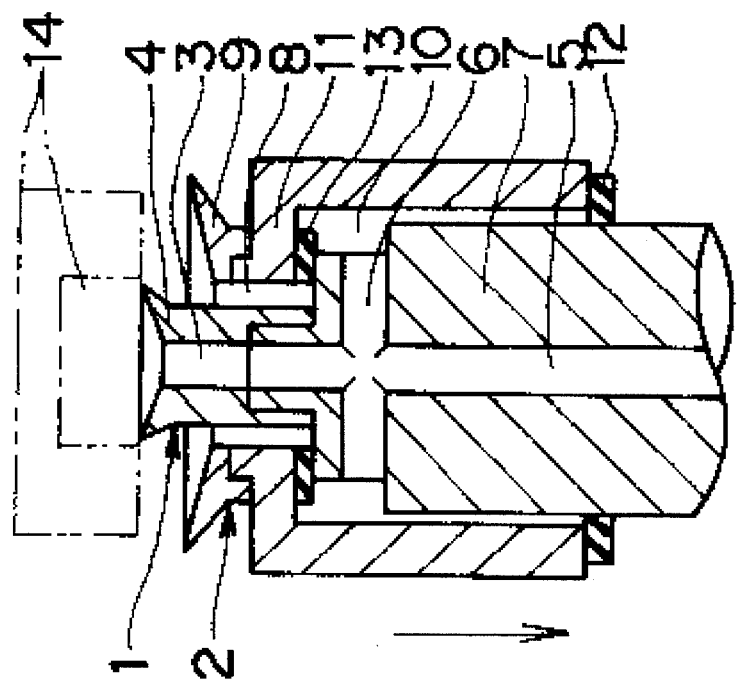

VACUUM FIXING DEVICE FOR PARTS

This is a continuation of application Ser. No. 08/183,502 filed on Jan. 18, 1994, now abandoned.

BACKGROUND OF THE INVENTION

1. Field of the Invention

This invention relates to a vacuum fixing device for parts, and more particularly to an effective technique applied to a vacuum fixing device which sucks and fixes a part in a vacuum or reduced pressure state, wherein a variety of parts can be sucked and fixed successively by simply switching a small vacuum pad over to a large vacuum pad or vice versa.

2. Related Art Statement

For example, a vacuum fixing device for sucking and fixing a part is used in a parts transfer system in an interlocking relation to a chip mounter which mounts an electronic part such as a semiconductor device onto a printed circuit board, in such a manner that the electronic parts housed in a tray or the like are taken out one by one at a loading position, sucked and fixed by a vacuum pad of the vacuum fixing device, transferred to a predetermined releasing position through a transfer path, and thereafter, mounted onto the printed circuit board by a chip mounter.

Among the vacuum fixing devices as described above, there are one In which a small vacuum pad and a large vacuum pad, which are formed as separate bodies having different diameters from each other, can be exchanged for each other. Another type of device employs two axes system in which a small vacuum pad and a large vacuum pad are mounted on their axes respectively and can be switched over to each other. In both types of devices, for fixing a part in a vacuum or reduced pressure state by a vacuum pad, the small vacuum pad or the large vacuum pad is selected according to the size of the part to be fixed.

However, according to the above-described conventional technique, for example, in the system wherein the small vacuum pad and the large vacuum pad which are formed as separate bodies are exchanged, such problems are presented that the exchange by a worker is necessary in accordance with a change of the size of a part to be fixed, and, particularly, when the vacuum fixing device is used in an interlocking relation to another apparatus, the exchange may be impracticable.

Furthermore, in the case where two axes system is employed to switch over the small vacuum pad to the large vacuum pad or vice versa, because the positions of the two axes are different from each other, the positions of loading and releasing a part are different depending on whether the small vacuum pad or the large vacuum pad is used, whereby control of switchover or the like becomes difficult, and further, the operation time is lengthened.

SUMMARY OF THE INVENTION

Then, it is an object of the present invention to provide a part vacuum fixing device wherein switching a small vacuum pad (a small pad) over to a large vacuum pad (a large pad) or vice versa can be easily performed, and a variety of parts can be successively sucked and fixed.

A typical invention out of ones disclosed herein is described briefly.

The vacuum fixing device for parts according to the present invention is a device for sucking a part in vacuum or a reduced pressure state, wherein a small pad portion and a large pad portion, which are each formed therein with suction paths and are different in diameter from each other, are provided on one and the same axis and either the small pad portion or the large pad portion is slidable in the vertical direction.

The small pad portion may comprise: a small vacuum pad (a small pad) formed therein with a suction path in the axial direction thereof; and a fixed shaft fixed to the small pad and formed therein with (i) a suction path communicated with the suction path of the small pad and (ii) air paths opened in the diametral direction thereof;

while the large pad portion may comprise: a large vacuum pad (a large pad) formed therein with a suction path having an inner diameter larger than an outer diameter of the small pad in the axial direction thereof; and a movable shaft, to which the large pad is fixed and formed therein with a suction path communicated with the suction path of the large pad and also communicated with the air paths of the small pad.

Furthermore, seal members may be interposed at sliding portions and/or contact portions between the outer peripheral portion of the small pad portion and the inner peripheral portion of the large pad portion.

In the above-described vacuum fixing device for parts, either one of the small pad portion and the large pad portion which are provided on one and the same axis is slid in the vertical direction, whereby the small pad portion is switched over to the large pad portion or vice versa by request. In the case of suction by the small pad of the small pad portion for example, the movable shaft of the large pad portion is slid downwardly and suction can be made through the suction path of the small pad and the suction path of the fixed shaft.

On the other hand, in the case of suction by the large pad of the large pad portion, the movable shaft of the large pad portion is slid upwardly, whereby suction is made through the suction path of the large pad, the suction path of the movable shaft, and the air paths and the suction path of the fixed shaft of the small pad portion operate, and additionally through the route of the suction path of the small pad and the suction path of the fixed shaft, so that the suction can be made through two routes.

With this arrangement, switchover from the small pad portion to the large pad portion or vice versa can be easily performed with a simplified construction, so that a variety of parts different in size can be sucked and fixed. Moreover, in the system using the device of the present invention, control of positions, heights and the like in relation to loading and releasing of parts can be simplified.

Particularly, when seal members are interposed at sliding portions and/or contact portions between the small pad portion and the large pad portion, even if either the small pad portion or the large pad portion is slid in the vertical direction, air leakage during the suction can be prevented, so that strong sucking and fixing can be realized.

BRIEF DESCRIPTION OF THE DRAWINGS

The above-described and other objects, and novel features of the present invention will become apparent more fully from the description of the specification in conjunction with the accompanying drawings, in which:

FIGS. 1(a) and 1(b) are respectively sectional views showing switchover from the small pad portion to the large pad portion or vice versa in an embodiment of the vacuum fixing device according to the present invention.

DETAILED DESCRIPTION OF THE PREFERRED EMBODIMENTS

Firstly, an arrangement of an embodiment of the vacuum fixing device according to the present invention will be described with reference to FIGS. 1(a) and 1(b).

The vacuum fixing device In this embodiment is one for sucking and fixing a part such as a semiconductor device in a vacuum or reduced pressure state for example, comprising a small pad portion 1 and a large pad portion 2 which are different in diameter from each other and each formed therein with suction paths, wherein either the small pad portion 1 or the large pad portion 2 is slid In the vertical direction, and thereby the small pad portion 1 is switched over to the large pad portion 2 or vice versa by request.

The small pad portion 1 comprises: a small pad 4 formed therein with the suction path 3 in the axial direction thereof; and a fixed shaft 7 formed therein with the suction path 5 communicated with the suction path 3 of the small pad 4 and air paths 6 opened in the diametral direction thereof, this fixed shaft 7 being fixed to the small pad 4.

The large pad portion 2 comprises: a large pad 9 formed therein with the suction path 8 in the axial direction thereof, the suction path 8 having an inner diameter larger than an outer diameter of the small pad 4; and a movable shaft 11 formed therein with the suction path 10 communicated with the suction path 8 of the large pad 9 and further communicated with the air paths 6 of the small pad 4, the movable shaft 11 being fixed to the large pad 9.

Then, a seal member 12 for preventing air leakage is interposed at a sliding portion between the small pad portion 1 and the large pad portion 2, particularly, between the outer peripheral portion of the fixed shaft 7 in the small pad portion 1 and the end portion of the movable shaft 11 in the large pad portion 2, and further, a seal member 13 is interposed between the outer peripheral portion of the fixed shaft 7 and the suction path 10 of the movable shaft at portions which are brought into contact with each other when the device is switched over to the small pad portion 1.

Next, description will be given of the operation of this embodiment where a part is actually sucked and fixed, with reference to FIGS. 1(a) and 1(b). In FIG. 1(a), there is shown a case where a small part 14 is sucked and fixed through the small pad portion 1, while, FIG. 1(b) is a case where a large part 15 is sucked and fixed through the large pad portion 2.

For example, when the small part 14 corresponding to the size of the small pad 4 of the small pad portion 1 is sucked, the movable shaft 11 of the large pad portion 2 is slid downwardly as shown in FIG. 1(a). At this time, the suction paths 8 and 10, which are communicated from the large pad portion 2 to the small pad portion 1, are shut off by the seal member 13 and only the suction path 3 of the small pad 4 is connected to an air pressure source, not shown, through the suction path 5 of the fixed shaft 7.

With this arrangement, suction is performed from the suction path 3 of the small pad 4 through the suction path 5 of the fixed shaft 7, so that the small part 14 having an external shape being about one or two times the sucking surface of the small pad 4 can be sucked and fixed by tile small pad 4.

On the other hand, when the large part 15 corresponding to the size of the large pad 9 of the large pad portion 2 is sucked and fixed, the movable shaft 11 of the large pad portion 2 is slid upwardly as shown in FIG. 1(b). At this time, the suction path 8 of the large pad portion 9 is connected to the air pressure source through the suction path 10 of the movable shaft 11, and the air paths 6 and the suction path 5 of the fixed shaft 7, while, the suction path 3 of the small pad 4 is connected to the air pressure source through the suction path 5 of tile fixed shaft 7.

With this arrangement, suction is performed by both suction routes including a route leading from the suction path 8 of the large pad 9 through the suction path 10 of the movable shaft 11 and the air paths 6 to the suction path 5 of the fixed shaft 7, and another route leading from the suction path 3 of the small pad 4 to the suction path 5 of the fixed shaft 7, so that the large part 15 having an external shape being about one or two times the sucking surface of the large pad 9 can be sucked and fixed by both tile large pad 9 and the small pad 4.

The part vacuum fixing device as described above is used in a parts transfer system for transferring electronic parts for example, and utilized In an interlocking relation to a chip mounter for mounting an electronic part such as a semiconductor device onto a printed circuit board and so forth.

In the above-described cases, switchover from the small pad portion 1 to the large pad portion 2 or vice versa makes it possible to easily suck and fix a variety of parts different in size, and particularly when assembled into a transfer system and the like, parts are loaded and released at the same positions for both the small pad portion 4 and the large pad portion 9, so that control can be easily performed as compared with the conventional technique, and control time can be shortened.

Furthermore, by making the small pad portion 1 fixed and the large pad portion 2 movable, switching of an air pressure circuit and construction thereof can be simplified, and the same vertical position of sucking and fixing can be adopted for both the small pad 4 and the large pad 9, so that control in height of the small pad 4 and the large pad 9 is dispensable and control can be further simplified.

Further, by making the large pad portion 2 automatically movable in the vertical direction when assembled into a transfer system, it becomes possible to automatically switch the small pad portion 1 over to the large pad portion 2 or vice versa and to successively transfer the variety of parts by the same transfer apparatus.

Accordingly, in the vacuum fixing device in this embodiment, by sliding the movable shaft 11 of the large pad portion 2 in the vertical direction, the small pad portion 1 including the small pad 4 and the fixed shaft 7 is switched over to the large pad portion 2 including the large pad 9 and the movable shaft 11 or vice versa, so that switching control can be simplified with the simplified construction and the variety of parts which are different in size from one another can be sucked and fixed.

Hereinabove, the present invention has been described in detail with reference to the embodiment, however, the present invention should not be limited to the above embodiment, and, various modifications are possible within the scope of the invention.

For example, in the vacuum fixing device of the embodiment, the movable shaft 11 of the large pad portion 2 is slid in the vertical direction to switch the small pad portion 1 over to the large pad portion 2 or vice versa. The present invention, however, should not be limited to the above embodiment, and, the present invention can be applied to a case where the small pad portion is slid in the vertical direction.

In the embodiment, the large pad is formed therein with the suction path having the inner diameter larger than the outer diameter of said small pad in the axial direction thereof. However, for the suction path of the large pad to be operative, it is sufficient only that, when the moving shaft is slid upwardly, the large pad does not contact the small pad, the suction path being open.

Furthermore, regarding the small pad portion 1 and the large pad portion 2 in this embodiment, the bottom surface of either the small part 14 or the large part 15 is sucked and fixed. It is needless to say that various modifications can be made in the direction of sucking a part with accompanying changes in the structure, such as a ease of sucking the top surface with the construction of the vacuum fixing device being changed by inverting the top and the bottom, and a ease of sucking the side surface of a part.

Further, the embodiment has been described on the ease where it is used in a parts transfer system and the like. The present invention, however, should not be limited to this, and, needless to say, the invention can be widely applied to other systems where, in particular, sucking and fixing of a variety of parts are required.

In the above description, there has been taken up the case where the invention is applied to a vacuum fixing device for sucking and fixing an electronic part such as a semiconductor device, however, the present invention should not be limited to this, and is widely applicable to other electronic parts and non-electronic parts which can be sucked and fixed in general.

The following is a brief description of the results obtained by the typical ones out of the inventions disclosed herein. (1) The small pad portion and the large pad portion which are different in diameter from each other and each formed therein with tile suction paths are provided on one and the same axis, and either the small pad portion or the large pad portion is slid in the vertical direction, whereby switchover from the small pad portion to the large pad portion or vice versa can be performed by request, so that a variety of parts different in size from one another can be sucked and fixed with the simplified construction. (2) The seal members are interposed at sliding portions and/or contacting portions between the outer peripheral portion of the small pad portion and the inner peripheral portion of the large pad portion, whereby, even when the small pad portion or the large pad portion is slid in the vertical direction, the air leakage due to the suction can be prevented, so that the strong sucking and fixing can be performed. (3) By the above item (1), the control of positions of loading and releasing of a part can be simplified and the control of position of height of sucking and fixing can be dispensed with, so that the control in the sucking of a part can be simplified and the control time can be shortened. (4) By the above item (1), the move of the small pad portion or the large pad portion in the vertical direction can be automated, so that, in particular, when the vacuum fixing device is assembled into an automatic transfer line or the like, a variety of parts can be successively treated. (5) By the above items (1) to (4), particularly, in the case of sucking a part in a vacuum or reduced pressure state, simple switchover from the small pad to the large pad or vice versa is performed, so that such a vacuum fixing device can be obtained that a variety of parts can be sucked and fixed.

What is claimed is:

1. A vacuum fixing device for sucking and fixing electronic parts in vacuum or in a reduced pressure state, said device being used in an interlocking relation to a chip mounter for mounting said parts onto a printed circuit board and said device comprising:

a small pad portion, which comprises:

a small pad;

a suction path formed in said small pad in the axial direction thereof; and a fixed shaft fixed to said small pad and formed therein with a suction path communicated with the suction path of said small pad and with a plurality of air paths opened in the diametrical direction thereof;

a large pad portion, which comprises:

a large pad;

a suction path formed in said large pad in the axial direction thereof, said suction path having an inner diameter larger than an outer diameter of said small pad; and a movable shaft fixed to the large pad and formed therein with a suction path communicated with the suction path of said large pad and also communicated with the air paths of said fixed shaft of said small pad portion; and a plurality of seal members provided at a sliding portion and/or a contacting portion between the outer peripheral portion of said small pad portion and the inner peripheral portion of said large pad portion, wherein:

said small pad portion and said large pad portion are arranged to be slidable in the vertical direction so that said small pad portion is switched over to said large pad portion or vice versa;

said small pad portion and said large pad portion are formed different in diameter from each other and provided on the same axis;

said movable shaft is slid downwardly so that suction is performed through the suction path of said small pad and the suction path of said fixed shaft, in the case of suction by the small pad;

said movable shaft is slid upwardly so that suction is performed through the suction path of said large pad, the suction path of said movable shaft, and the air paths and the suction path of said fixed shaft, and further through the suction path of said small pad and the suction path of said fixed shaft, in the case of suction by the large pad;

one of said seal members is interposed between the outer peripheral portion of said fixed shaft of the small pad portion and the end portion of said movable shaft of the large pad;

another seal member is interposed between portions, which are brought into contact with each other, of the outer peripheral portion of said fixed shaft and the suction path of said movable shaft when switch over to said small pad is performed, one of said seal members is provided in the middle of the suction path of the large pad portion so as to shut off said suction path when the large pad portion is slid downwardly to suck the electronic parts by the small pad portion; and said small pad portion and said large pad portion are arranged to suck and fix the electronic parts at same vertical position, so that large electronic parts are sucked by both said small pad and said large pad through both suction paths of said small and large pad portions.

2. The vacuum fixing device as set forth in claim 1, wherein said small pad and said large pad are automatically switched over from each other in such a manner that, when the part is small, sucking is made by said small pad and, when the part is large, sucking is made by said large pad.

* * * * *